(12) United States Patent
Sasaki (10) Patent No.: US 8,956,748 B2
(45) Date of Patent: Feb. 17, 2015

(54) BATTERY

(75) Inventor: Takeshi Sasaki, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 135 days.

(21) Appl. No.: 13/699,191

(22) PCT Filed: May 20, 2011

(86) PCT No.: PCT/JP2011/061614
§ 371 (c)(1), (2), (4) Date: Nov. 20, 2012

(87) PCT Pub. No.: WO2011/148866
PCT Pub. Date: Dec. 1, 2011

(65) Prior Publication Data
US 2013/0071712 A1    Mar. 21, 2013

(30) Foreign Application Priority Data

May 26, 2010 (JP) ................................. 2010-120803

(51) Int. Cl.
| | |
|---|---|
| *H01M 6/10* | (2006.01) |
| *H01M 6/12* | (2006.01) |
| *H01M 4/88* | (2006.01) |
| *H01M 10/04* | (2006.01) |
| *H01M 10/0587* | (2010.01) |
| *H01M 10/36* | (2010.01) |

(52) U.S. Cl.
CPC ............ *H01M 6/12* (2013.01); *H01M 6/10* (2013.01); *H01M 4/8896* (2013.01); *H01M 10/0431* (2013.01); *H01M 10/0587* (2013.01); *H01M 10/36* (2013.01)
USPC ............................................. 429/94; 429/209

(58) Field of Classification Search
None
See application file for complete search history.

(56) References Cited

U.S. PATENT DOCUMENTS

| | | | |
|---|---|---|---|
| 6,033,795 | A | 3/2000 | Broussely et al. |
| 6,841,295 | B2 | 1/2005 | Exnar |

(Continued)

FOREIGN PATENT DOCUMENTS

| | | |
|---|---|---|
| EP | 0867960 | 9/1998 |
| JP | 09-213374 | 8/1997 |

(Continued)

OTHER PUBLICATIONS

International Search Report filed in PCT/JP2011/061614.

*Primary Examiner* — Ula C. Ruddock
*Assistant Examiner* — Scott J Chmielecki
(74) *Attorney, Agent, or Firm* — Rankin, Hill & Clark LLP (57) ABSTRACT

The invention allows a positive electrode plate and a negative electrode plate of a power generating element of a battery to function as effectively as possible. In the battery including the power generating element formed by winding the foil-shaped positive electrode plate 23a and the foil-shaped negative electrode plate 23b, on which active material layers are formed respectively, about a winding core 21, with separators 24a and 24b sandwiched therebetween, and forming the plates into a flat shape, the winding core 21 is formed by a porous member and the foil-shaped positive electrode plate 23a and the foil-shaped negative electrode plate 23b are disposed so that faces of the plates, on which the active material layers are formed, face each other with the winding core 21 interposed therebetween at an innermost layer of the winding.

18 Claims, 8 Drawing Sheets

(56) References Cited

U.S. PATENT DOCUMENTS

| | | |
|---|---|---|
| 2002/0071986 A1 | 6/2002 | Exnar |
| 2005/0003264 A1* | 1/2005 | Oh et al. .................. 429/94 |
| 2010/0099013 A1* | 4/2010 | Holung et al. ............. 429/50 |

FOREIGN PATENT DOCUMENTS

| | | |
|---|---|---|
| JP | 11-007933 | 1/1999 |
| JP | 11-339839 | 12/1999 |
| JP | 2000-340263 | 12/2000 |
| JP | 2002-231299 | 8/2002 |
| JP | 2003-086233 | 3/2003 |
| JP | 2003-282136 | 10/2003 |
| JP | 2003-297326 | 10/2003 |
| JP | 2009-266737 | 11/2009 |

* cited by examiner

BATTERY

TECHNICAL FIELD

The present invention relates to a battery including a power generating element formed into a flat shape by winding a foil-shaped positive electrode plate and a foil-shaped negative electrode plate, on which active material layers are formed respectively, about a winding core, with a separator sandwiched therebetween.

BACKGROUND ART

The power generating element forming this battery is what is called a winding-type battery element and is especially a power generating element formed into a flat shape in order to respond to requests for a thin power generating element.

Such a power generating element is basically formed by winding a foil-shaped positive electrode plate and the foil-shaped negative electrode plate, on which active material layers are formed respectively, about a winding core, with separators sandwiched therebetween and is formed into the flat shape by forming the winding core itself into a flat shape as described in below-described Patent Document 1, for example, or by winding the foil-shaped positive electrode plate and the like about a circular cylindrical winding core and pressing and flattening them.

By forming the power generating element into the flat shape to thereby obtain the thin power generating element as described above, it is possible to achieve satisfactory radiation performance. Moreover, when the battery case in a shape of a rectangular parallelepiped is used, the flat power generating element has an advantage that a dead space between the power generating element and an inner face of a case is small, and therefore the power generating element can be disposed while effectively utilizing a capacity in the case.

PRIOR ART DOCUMENT

Patent Document

Patent Document 1: JP-A-11-339839

SUMMARY OF THE INVENTION

Problems to be Solved by the Invention

However, because the above-described conventional structure generally has a winding form in which one of the electrode plates (generally, the negative electrode plate) makes a full circle around the winding core at a winding starting position of the negative electrode plate or the positive electrode plate in the power generating element, parts of the same negative electrode plate (or the same positive electrode plate) face each other at an innermost layer of the winding and there is a plate portion which does not function as a battery. If the parts of the negative electrode plate face each other, as is generally the case, at the innermost layer, the negative electrode plate at the innermost layer wastes ions (lithium ions in a case of a lithium-ion battery) to reduce a capacity retention ratio of the battery. If the innermost layer is the positive electrode plate, the active material on the positive electrode plate does not effectively function.

The present invention has been made with such circumstances in view and its object is to allow the positive electrode plate and the negative electrode plate of the power generating element to function as effectively as possible.

Means for Solving the Problems

In accordance with a first aspect of the present application, there is provided a battery including a power generating element formed by winding a foil-shaped positive electrode plate and a foil-shaped negative electrode plate, on which active material layers are formed respectively, about a winding core, with a separator sandwiched therebetween, and forming the plates into a flat shape, wherein the winding core is formed by a porous member, and the foil-shaped positive electrode plate and the foil-shaped negative electrode plate are disposed so that faces of the plates, on which the active material layers are formed, face each other at an innermost layer of winding with the winding core interposed therebetween.

As described above, the foil-shaped positive electrode plate and the foil-shaped negative electrode plate face each other at the innermost layer where the foil-shaped positive electrode plate or the foil-shaped negative electrode plate starts to be wound about the winding core which is a core for winding in the winding-type power generating element, and the winding core positioned between both the plates is formed by the porous member. Therefore, a substance such as ions forming reaction processes of the battery move between both the plates and the charge reaction or the charge-and-discharge reaction proceeds properly.

In other words, the foil-shaped positive electrode plate and the foil-shaped negative electrode plate function as the battery even at the innermost layer of the power generating element.

Herein, the porous member refers to the member having a large number of fine thorough transfer paths through which the substance such as the ions forming the reaction processes can move between the foil-shaped positive electrode plate and the foil-shaped negative electrode plate facing each other and includes a member formed by a foaming technique and a member formed by fused unwoven fabric.

The state in which the respective faces of the foil-shaped positive electrode plate and the foil-shaped negative electrode plate and provided with the active materials face each other with the winding core interposed therebetween can be achieved in various forms, e.g., a form in which a porous sheet member having a length corresponding to half a circumference of the winding core is attached, as a lead, to a tip end side of one of the foil-shaped positive electrode plate and the foil-shaped negative electrode plate and both the electrode plates start to be wound from the same position, besides the structure in which the winding starting positions of the foil-shaped positive electrode plate and the foil-shaped negative electrode plate on the winding core are displaced from each other by half a circumference.

In accordance with a second aspect of the present application, in addition to the structure in the first aspect, the power generating element is formed into the flat shape by winding the foil-shaped positive electrode plate and the foil-shaped negative electrode plate, with the separator sandwiched therebetween, about the winding core formed by forming a flexible sheet-shaped member into a circular cylindrical shape and pressing electrode the plates in a direction of a normal to an outer peripheral face.

In other words, the winding core about which the foil-shaped positive electrode plate and the like are to be wound is formed by the sheet-shaped member, and therefore it is easy to form the winding core as a porous member.

In accordance with a third aspect of the present application, in addition to the structure in the first or second aspect, a positioning member for coming in contact with and positioning a tip end portion of the foil-shaped positive electrode plate or the foil-shaped negative electrode plate is attached to a face of the winding core on which the foil-shaped positive electrode plate, the foil-shaped negative electrode plate, or the separator is to be wound.

In other words, in the state in which the respective faces of the foil-shaped positive electrode plate and the foil-shaped negative electrode plate and provided with the active materials face each other with the winding core interposed therebetween, it is preferable that as large areas as possible of the positive electrode side and the negative electrode side properly face each other. For this purpose, the positioning member is provided to accurately set the winding starting position.

In accordance with a fourth aspect of the present application, in addition to the structure in the third aspect, the positioning member is formed by a sheet-shaped member extending out along a winding direction of the foil-shaped positive electrode plate, the foil-shaped negative electrode plate, or the separator, with one end of the sheet-shaped member fixed to the face of the winding core.

Therefore, with the tip end of the foil-shaped positive electrode plate or the foil-shaped negative electrode plate fitted in a base end position of the sheet-shaped positioning member, the foil-shaped positive electrode plate or the foil-shaped negative electrode plate and the sheet-shaped positioning member are wound together.

In accordance with a fifth aspect of the present application, in addition to the structure in the fourth aspect, the positioning member is formed by fixing a tip end portion of the separator on a winding starting side to the winding core.

In other words, by fixing the tip end of the separator to the winding core by fusion, for example, the separator is also used as the positioning member.

A sixth aspect of the present application includes, in addition to the structures in the third to fifth aspects, a pair of positioning members, each equivalent to the positioning member, respectively for positioning the foil-shaped positive electrode plate and the foil-shaped negative electrode plate and allocated to longitudinal opposite end portions of the winding core when seen in a direction of a winding axis.

In other words, winding starting positions of the foil-shaped positive electrode plate and the foil-shaped negative electrode plate on the winding core are displaced from each other so that the respective faces of the foil-shaped positive electrode plate and the foil-shaped negative electrode plate provided with the active materials face each other with the winding core interposed therebetween.

At this time, the foil-shaped positive electrode plate and the foil-shaped negative electrode plate can properly face each other at an innermost layer of the power generating element.

Advantages of the Invention

According to the first aspect, the foil-shaped positive electrode plate and the foil-shaped negative electrode plate function as the battery even at the innermost layer of the power generating element, and therefore it is possible to cause the positive electrode plate and the negative electrode plate of the power generating element to function as effectively as possible.

According to the second aspect, the winding core about which the foil-shaped positive electrode plate and the like are to be wound is formed by the sheet-shaped member, and therefore it is easy to form the winding core as the porous member to thereby contribute to reduction of manufacturing cost of the battery.

According to the third aspect, by providing the positioning member and accurately setting the winding starting position, it is possible to cause the foil-shaped positive electrode plate and the foil-shaped negative electrode plate to efficiently function as the battery at the innermost layer.

According to the fourth aspect, because it is possible to carry out positioning of the foil-shaped positive electrode plate or the foil-shaped negative electrode plate only by winding the foil-shaped positive electrode plate or the foil-shaped negative electrode plate and the sheet-shaped positioning member together with the tip end of the foil-shaped positive electrode plate or the foil-shaped negative electrode plate fitted in the base end position of the sheet-shaped positioning member, a positioning operation of the foil-shaped positive electrode plate or the foil-shaped negative electrode plate can be carried out easily.

According to the fifth aspect, the separator can also be used as the positioning member, which contributes to reduction of the manufacturing cost of the battery.

According to the sixth aspect, the foil-shaped positive electrode plate and the foil-shaped negative electrode plate can properly face each other at the innermost layer of the power generating element, and therefore it is possible to cause the foil-shaped positive electrode plate and the foil-shaped negative electrode plate to effectively function as the battery.

MODES FOR CARRYING OUT THE INVENTION

An embodiment of a battery according to the present invention will be described below based on the drawings.

In the present embodiment, a nonaqueous electrolyte secondary battery (more specifically, a lithium ion battery) as an example of a secondary battery will be described as the battery.

[Structure of Nonaqueous Electrolyte Secondary Battery RB]

Figure 1:
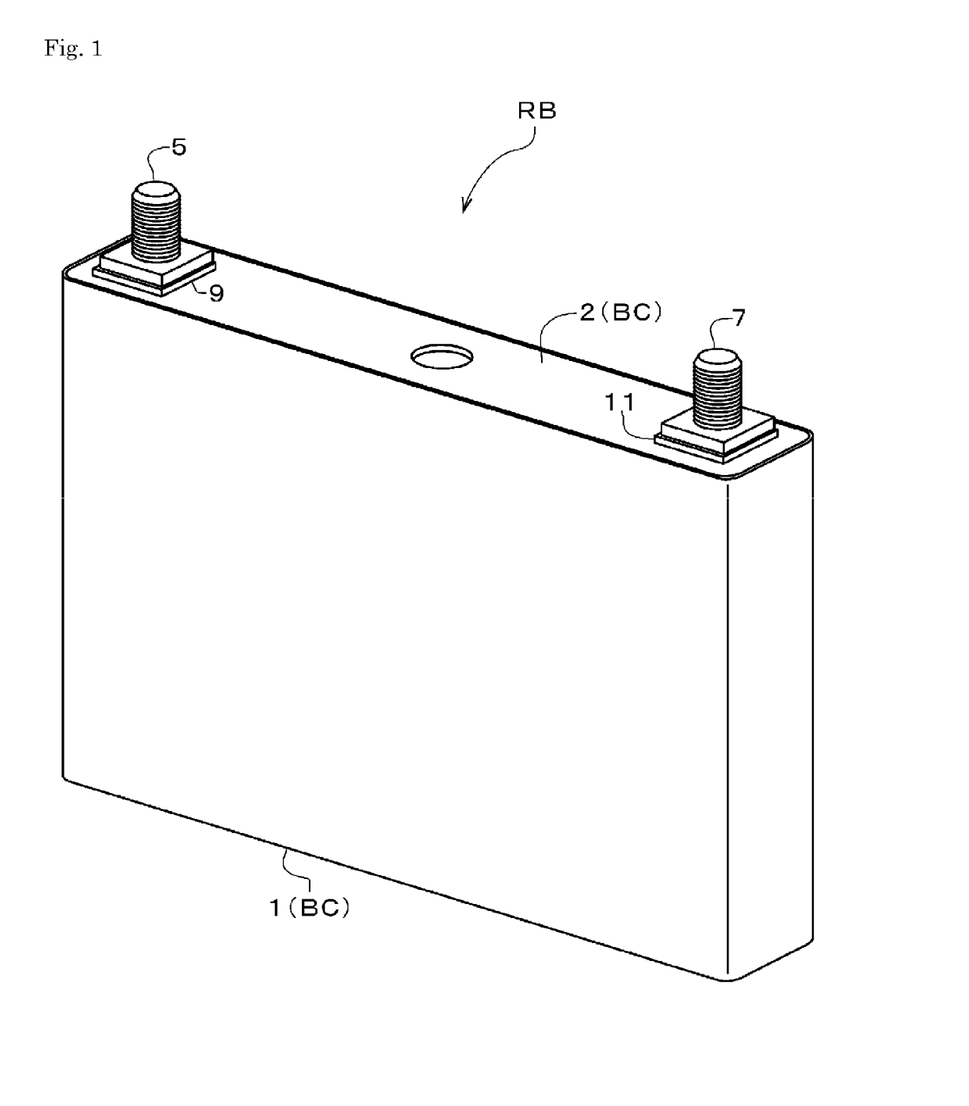
FIG. 1 is an external perspective view of a battery according to an embodiment of the present invention.
Figure 2:
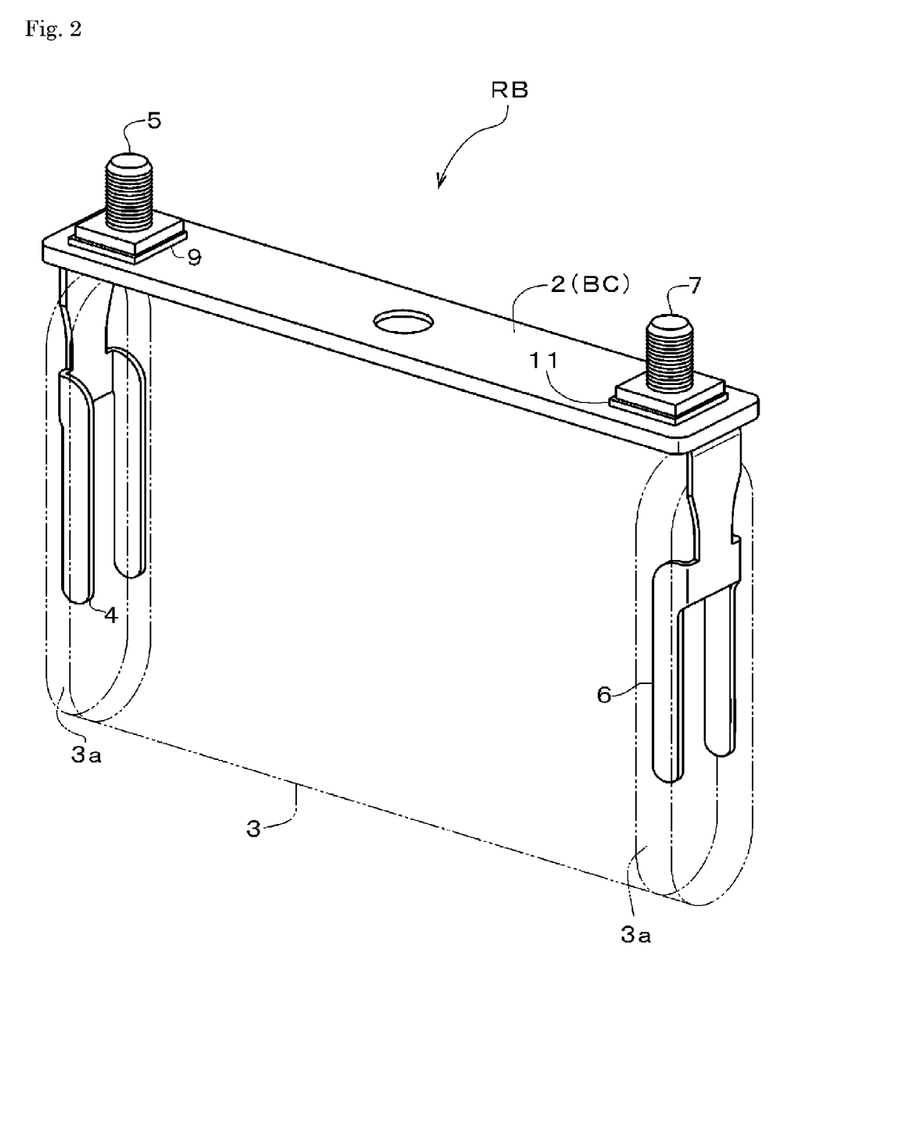
FIG. 2 is a perspective view of an inner structure of the battery according to the embodiment of the present invention.
Figure 3:
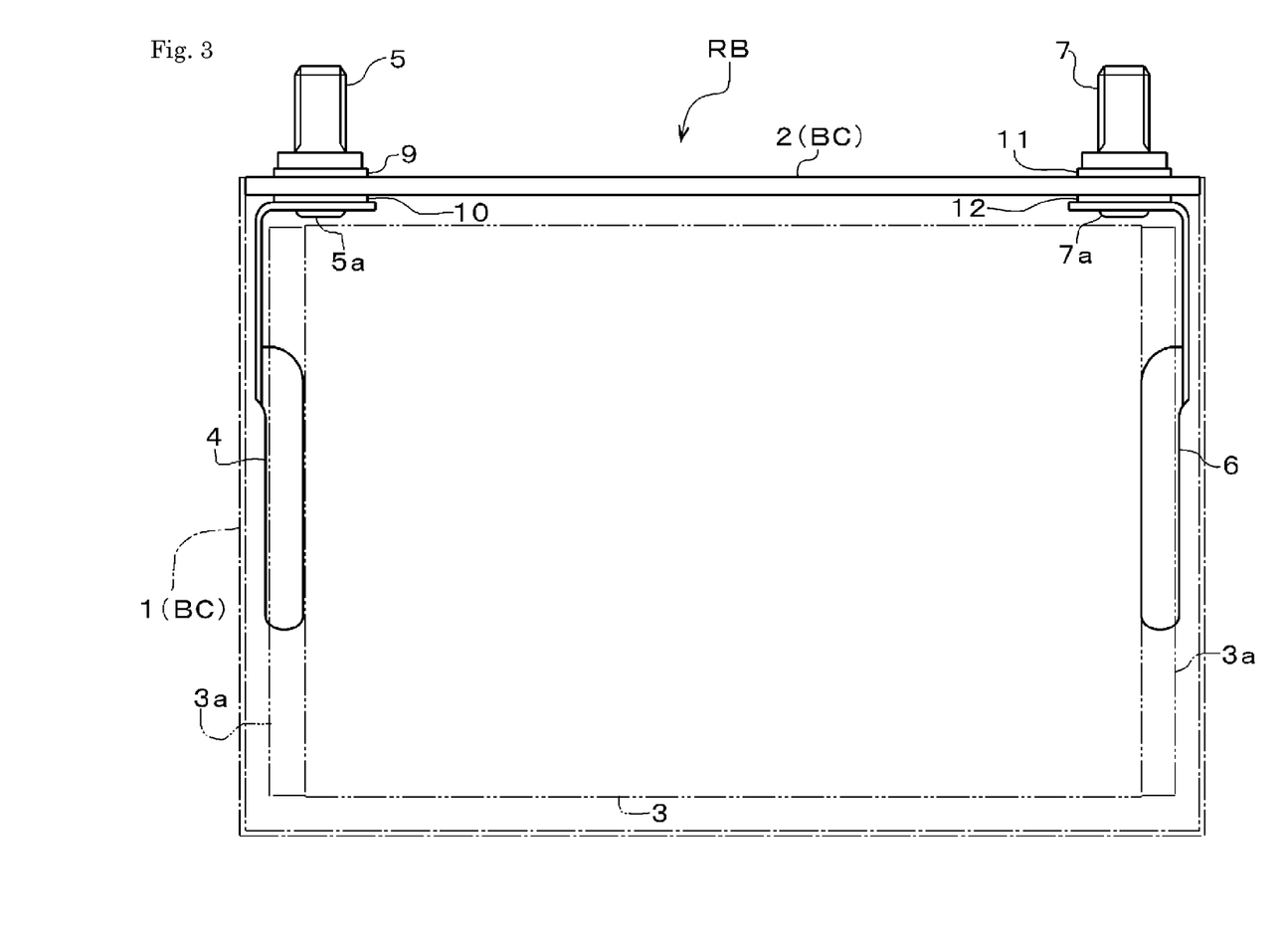
FIG. 3 is a front view of the inner structure of the battery according to the embodiment of the present invention.

As shown in perspective views in FIGS. 1 and 2 and a front view in FIG. 3, the nonaqueous electrolyte secondary battery RB in the present embodiment has a case BC formed by placing and welding a lid portion 2 substantially in a shape of a flat plate onto an open face of a can body 1 in a cylindrical shape with a bottom (more specifically, a rectangular cylindrical shape with a bottom). The lid portion 2 is formed in a shape of a strip-shaped rectangle and the case BC has a shape of a flat rectangular parallelepiped in its entirety. FIG. 2 shows an inner structure of the case BC by removing the can body 1 from the completed secondary battery RB (shown in FIG. 1). FIG. 3 shows the can body 1 by two-dot chain lines so that an inner portion of the case BC can be seen through the can body 1.

In the case BC, a power generating element 3 and current collectors 4 and 6 shown by the two-dot chain lines in FIGS. 2 and 3 are housed while immersed in an electrolyte solution. The power generating element 3, as will be described in detail below, is formed by respectively applying active materials on a pair of electrode plates including a foil-shaped positive electrode plate and a foil-shaped negative electrode plate and winding the electrode plates with separators sandwiched therebetween.

In the power generating element 3, a portion of the foil-shaped positive electrode plate, not applied with the active material, extends out from a side to be welded to the current collector 4, and a portion of the foil-shaped negative electrode plate, not applied with the active material, extends out from an opposite side to be welded to the current collector 6.

To the lid portion 2 made of metal (specifically, aluminum), the current collector 4 on a positive electrode side, a terminal bolt 5 serving as a positive electrode terminal connected to the current collector 4, the current collector 6 on a negative electrode side, and a negative terminal bolt 7 connected to the current collector 6 are attached.

The terminal bolt 5 is attached and fixed to the lid portion 2 by pinching two pieces of packing 9 and 10, disposed to sandwich the lid portion 2, between a head portion of the terminal bolt 5 and the current collector 4 and caulking a rivet 5a formed at the head portion of the terminal bolt 5.

A similar structure is provided on the negative electrode side and the terminal bolt 7 is fixed to the lid portion by pinching two pieces of packing 11 and 12, disposed to sandwich the lid portion 2, between a head portion of the terminal bolt 7 and the current collector 6 and caulking a rivet 7a formed at the head portion of the terminal bolt 7 (see FIG. 3).

The electrode structure on the negative electrode side and the electrode structure on the positive electrode side including the terminal bolts 5 and 7 and the current collectors 4 and 6 are the same as each other but disposed symmetrically, and metal members are made of different materials.

The metal members on the positive electrode side are made of aluminum and the metal members on the negative electrode side are made of copper.

[Manufacturing Process of Secondary Battery RB]

Next, a manufacturing process of the secondary battery RB will be described briefly.

First, assembly of the power generating element 3 will be described.

Figure 5:
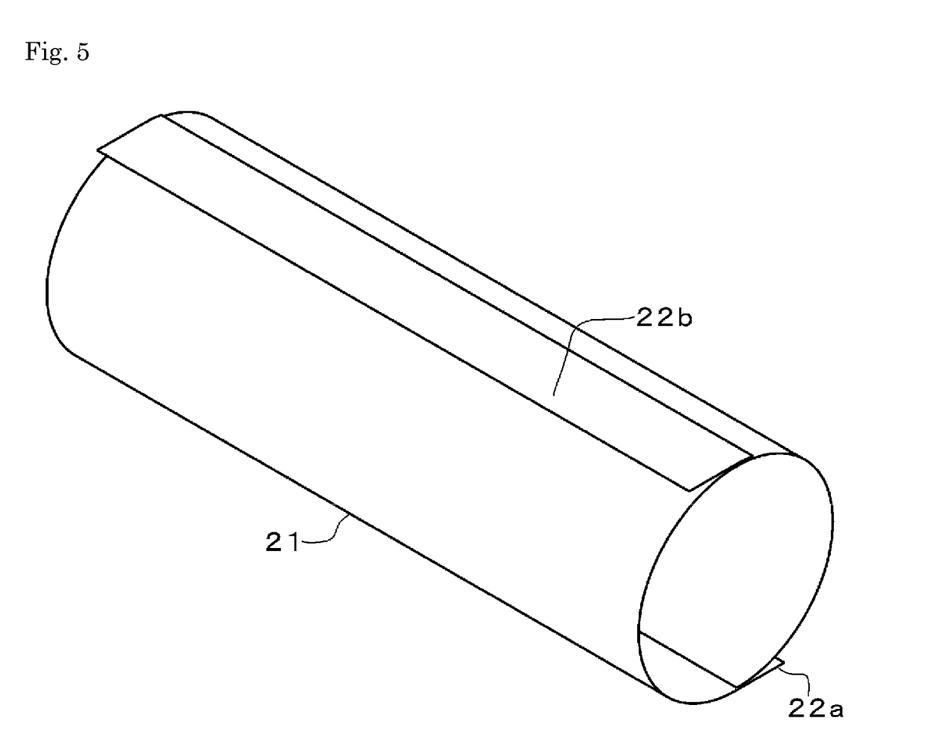
FIG. 5 is a perspective view of a winding core according to the embodiment of the present invention.

The power generating element 3 is produced by respectively applying a positive active material and a negative active material on front and back opposite faces of the long band-shaped aluminum foil and copper foil to form active material layers, to thereby obtain the foil-shaped positive electrode plate and the foil-shaped negative electrode plate and winding the electrode plates, with the separators sandwiched therebetween, about a winding core 21 shown in FIG. 5.

The winding core 21 is made of a material which is an electrical insulating material and which can withstand the electrolyte solution. Specifically, resin such as PPS (polyphenylene sulfide), PP (polypropylene), PE (polyethylene), and PVDF (polyvinylidene fluoride) may be used, and PPS is preferable from a viewpoint of heat resistance.

The winding core 21 is formed into a circular cylindrical shape by winding a flexible rectangular porous sheet-shaped member, and fine through paths for letting the electrolyte solution and a substance such as lithium ions forming charge and discharge reaction processes therethough are formed in the winding core 21.

An effective diameter of the through paths (through holes) is about the same as a particle size (about 10 μm on average) of the active materials on the foil-shaped positive electrode plate and the foil-shape negative electrode plate, and an infinite number of these fine holes are formed so that the active materials are exposed to the electrolyte solution as much as possible.

Moreover, as will be described in detail below, because the foil-shaped positive electrode plate and the foil-shaped negative electrode plate face each other with the winding core 21 interposed therebetween in the manufacturing process of the power generating element, a thickness of the sheet-shaped winding core 21 is set so as to maintain electrical insulation between the foil-shaped positive electrode plate and the foil-shaped negative electrode plate even when the electrode plates come in close contact with each other with the winding core 21 interposed therebetween.

As shown in FIG. 5, strip-shaped positioning members 22a and 22b are disposed on an outer peripheral face (a face on which the foil-shaped positive electrode plate 23a and the like are to be wound) of the circular cylindrical winding core 21 to be symmetric with respect to a central axis of the winding core 21 with their one ends of long sides fixed and retained on the outer peripheral face of the winding core 21. Therefore, the positioning members 22a and 22b are disposed to extend out along a winding direction of the foil-shaped positive electrode plate 23a and the like from the one end sides fixed to the outer peripheral face of the winding core 21.

Out of the pair of positioning members 22a and 22b, one positioning member 22a is formed by sticking and fixing opposite ends of the sheet-shaped member by fusion onto each other with one end slightly protruding in winding the sheet-shaped member to form the circular cylindrical winding core 21.

The other positioning member 22b is formed by cutting a sheet-shaped member made of the same material as the winding core 21 into a strip shape and fixing one end of a long side of the strip to the outer peripheral face of the winding core 21 by fusion.

Figure 6:
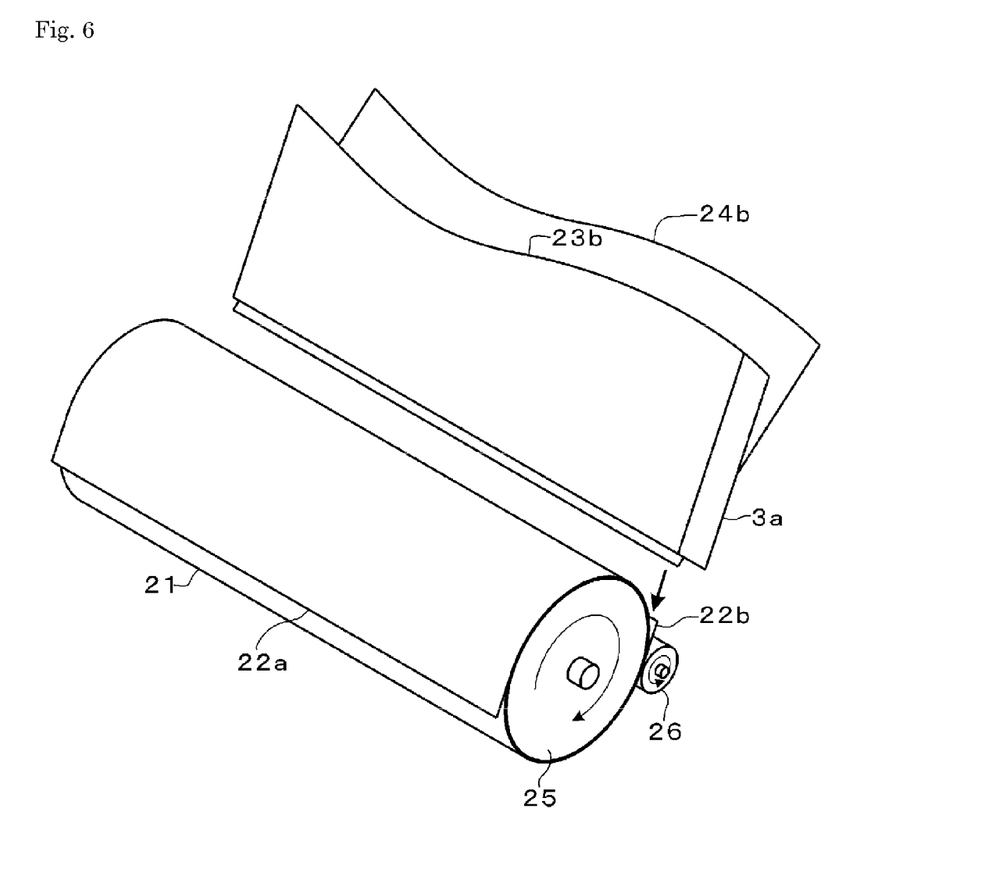
FIG. 6 is an explanatory view of a manufacturing process of the power generating element according to the embodiment of the present invention.

A winding process of the foil-shaped positive electrode plate 23a, a foil-shaped negative electrode plate 23b, and separators 24a and 24b about the winding core 21 in the above-described shape is carried out as schematically shown in FIG. 6.

FIG. 6 schematically shows a manner in which a winding roller 25 is passed through a hollow portion in the winding core 21 and the foil-shaped negative electrode plate 23b and the separator 24b are fed between the winding roller 25 and a pressing roller 26 pressed against an outer peripheral face of the winding roller 25 and wound.

In the present embodiment, winding starting positions of the foil-shaped positive electrode plate 23a and the foil-shaped negative electrode plate 23b are displaced from each other, and the respective winding starting positions are defined by the positioning members 22a and 22b.

In other words, in the present embodiment, the winding starting positions of the foil-shaped positive electrode plate 23a and the foil-shaped negative electrode plate 23b are displaced from each other by half a circumference of the winding core 21.

Either one of the foil-shaped positive electrode plate 23a and the foil-shaped negative electrode plate 23b may be wound first. In the present embodiment, the example in which the foil-shaped negative electrode plate 23b is wound first is shown and described briefly.

With the winding core 21 set on the winding roller 25, a rotating position of the winding core 21 is set so that the positioning member 22b is positioned before the pressing position of the pressing roller 26 (a state shown in FIG. 6).

From this state, the foil-shaped negative electrode plate 23b and the separator 24b, with their tip ends aligned with each other, are firmly inserted between the positioning member 22b and the outer peripheral face of the winding core 21 and positioned. At this time, the separator 24b is positioned on an outer periphery side of the foil-shaped negative electrode plate 23b when the separator 24b is superimposed on the foil-shaped negative electrode plate 23b.

As is schematically shown in FIG. 6, the separator 24b has substantially the same width as a height of the winding core 21, whereas the foil-shaped negative electrode plate 23b has a greater width than the height of the winding core 21 and protrudes to the front side in FIG. 6 from a range where the winding core 21 exists.

The protruding portion is a not-applied portion 3a not applied with the active material and the not-applied portion 3a is connected to the current collector 6 in the later process.

After the foil-shaped negative electrode plate 23b and the like are inserted in the position of the positioning member 22b, the winding roller 25 is driven for rotation in a direction shown by an arrow in FIG. 6. When the positioning member 22a on the opposite side moves to the position of the positioning member 22b in FIG. 6, the foil-shaped positive electrode plate 23a and the separator 24a with their tip ends aligned with each other are firmly inserted between the positioning member 22a and the outer peripheral face of the winding core 21 to thereby be positioned. Herein, the separator 24a is positioned on an outer periphery side of the foil-shaped positive electrode plate 23a and superimposed on the foil-shaped positive electrode plate 23a.

Although not shown in the drawings, the foil-shaped positive electrode plate 23a also has a greater width than the height of the winding core 21 and has a not-applied portion 3a protruding to an opposite side (a back side in FIG. 6) from that of the foil-shaped negative electrode plate 23b, and the protruding portion is connected to the current collector 4 in the later process.

After the foil-shaped negative electrode plate 23b and the separator 24b, which are inserted between the positioning member 22b and the outer peripheral face of the winding core 21, pass through the pressing position of the pressing roller 26 and until they circle around a rotation axis of the winding roller 25, the foil-shaped negative electrode plate 23b and the separator 24b are maintained in postures along the outer peripheral face of the winding core 21 only by the retaining force for pinching the tip ends thereof between the positioning member 22b and the outer peripheral face of the winding core 21. Because the sheet-shaped members forming the positioning members 22a and 22b have relatively high hardness, the tip ends of the foil-shaped negative electrode plate 23b and the separator 24b can be reliably held.

If the tip ends of the foil-shaped negative electrode plate 23b and the separator 24b cannot be reliably held between the positioning member 22b and the outer peripheral face of the winding core 21, the positioning member 22b which is wound first is formed to have a slightly greater length (a length in the circumferential direction of the winding core 21) than an outer circumference of the winding core 21 so as to maintain the tip ends of the foil-shaped negative electrode plate 23b and the separator 24b in the postures along the outer peripheral face of the winding core 21.

Then, the foil-shaped positive electrode plate 23a, the separator 24a, the foil-shaped negative electrode plate 23b, and the separator 24b layered in this order from an inner periphery side are wound about the winding core 21.

After the foil-shaped positive electrode plate 23a and the like having predetermined lengths are wound, they are detached from the winding roller 25 and pressed in a direction of the normal to the outer peripheral face into the flat shape to form the flat power generating element 3.

Figure 4:
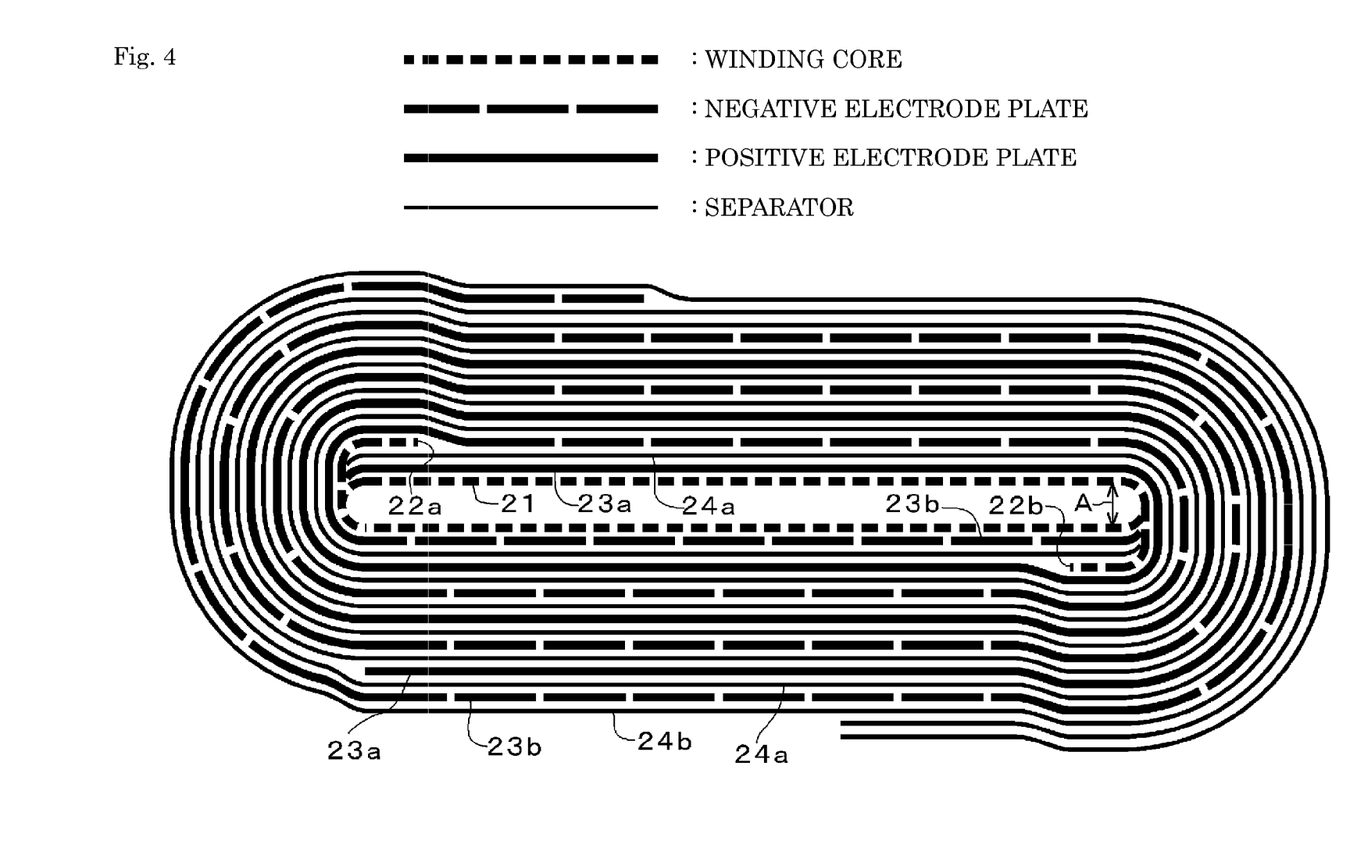
FIG. 4 is a schematic diagram showing a structure of a power generating element according to the embodiment of the present invention.

FIG. 4 schematically shows, in a direction of a winding axis of the winding core 21, a manner in which the foil-shaped positive electrode plate 23a and the like are wound about the winding core 21 in the flat shape.

As shown in FIG. 4, because the foil-shaped positive electrode plate 23a and the like and the winding core 21 are flattened so that mounted base end positions of the pair of positioning members 22a and 22b are allocated to longitudinal opposite end portions of the flat shape, when seen in the direction of the winding axis of the foil-shaped positive electrode plate 23a and the like, the respective faces of the foil-shaped positive electrode plate 23a and the foil-shaped negative electrode plate 23b, on which the active material layers are formed, face each other with the winding core 21 interposed therebetween at an innermost layer of winding and the active material layers formed on the opposed faces effectively function as the battery.

Material and thickness of the winding core 21 and pressurizing conditions in flattening the foil-shaped positive electrode plate 23a and the like wound about the winding core 21 are set so that a width (a width on a short width side), designated by a reference sign A in FIG. 4, of the flat winding core 21 when seen in the direction of the winding axis, is 1 mm or greater at least at the longitudinal end portions.

If the width A is excessively short, the foil-shaped negative electrode plate 23b and the like existing along the outer peripheral face of the short-width portion are not curved but bent at a sharp angle to worsen electric conductivity in the electrode plates and possibly damage the adjacent separators 24a and 24b. To avoid such situations, the width A is set as described above.

Next, assembly of the lid portion 2 will be described.

The lid portion 2 is formed by forming electrode mounting holes, to which the terminal bolts 5 and 7 are to be attached, in the aluminum plate material, and the current collectors 4 and 6 and the terminal bolts 5 and 7 are fixed to the plate material by caulking the rivets 5a and 7a with the pieces of packing 9, 10, 11, and 12 interposed therebetween.

Next, by welding and connecting the not-applied portions 3a of the power generating element 3 to the current collectors 4 and 6 fixed to the lid portion 2 as described above, the lid portion 2 and the power generating element 3 are integrated with each other.

Furthermore, the power generating element 3 is housed in a can body 1 and the lid portion 2 and the can body 1 are welded to each other to thereby complete assembly of the case BC of the secondary battery RB.

After the assembly of the case BC is completed, then, the electrolyte solution is injected into the case BC through an electrolyte solution filling inlet (not shown). When the injection of the electrolyte solution is completed, initial charge (preliminary charge) of the secondary battery RB is carried out under predetermined charging conditions, and then aging and the like are carried out to thereby complete the secondary battery RB.

Other Embodiments

Other embodiments of the present invention will be listed below.

(1) Although the positioning members 22a and 22b are made of the same material as the winding core 21 which is formed by the sheet-shaped member in the example shown in the above-described embodiment, the positioning members 22a and 22b may be made of different materials from the winding core 21.

For example, the separators 24a and 24b themselves may be also used as positioning members.

Figure 8:
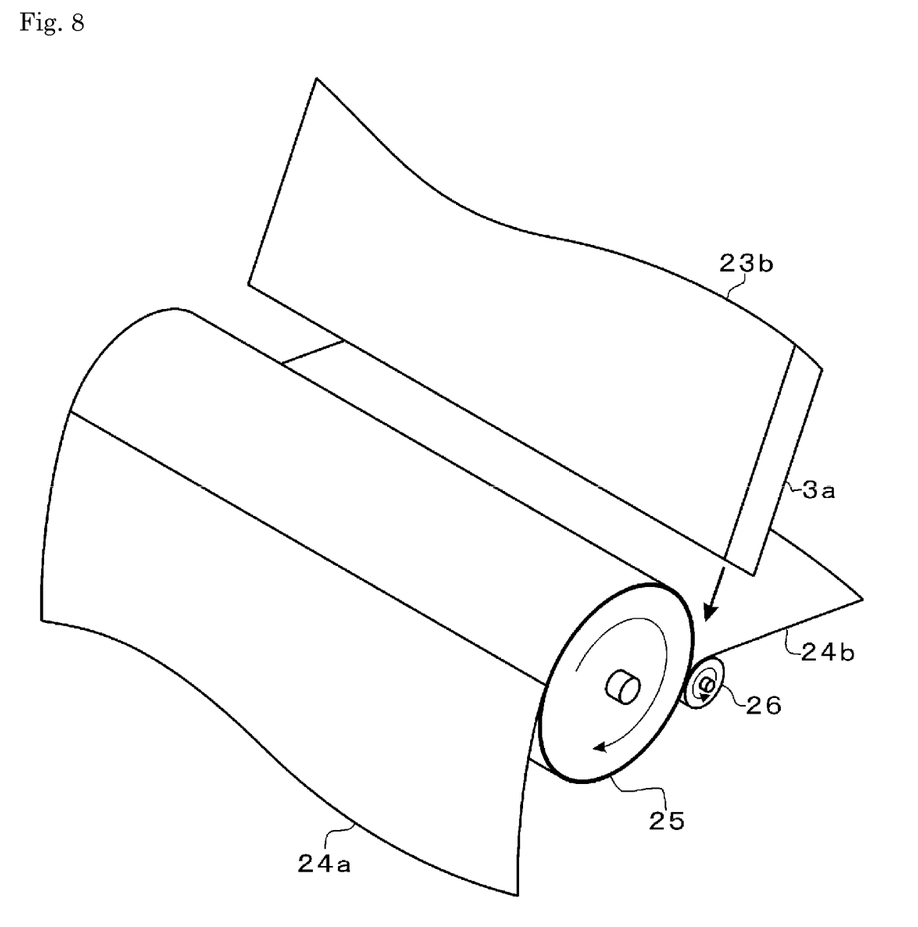
FIG. 8 is an explanatory view of a manufacturing process of the power generating element according to the other embodiment of the present invention.

Specifically, as shown in FIG. 8 corresponding to FIG. 6, tip ends of separators 24a and 24b, instead of positioning members 22a and 22b, are fixed by fusion or the like to mounting positions for the positioning members 22a and 22b on the outer peripheral face of the winding core 21 in the above-described embodiment.

Then, as shown in FIG. 8, a foil-shaped negative electrode plate 23b is inserted between the separator 24b and the outer peripheral face of the winding core 21 while fitted in a mounted base end position of the separator 24b. A winding roller 25 is driven for rotation in a direction shown by an arrow in FIG. 8 to wind the foil-shaped negative electrode plate 23b together with the separator 24b.

Then, when a mounted base end position of the separator 24a moves to the position of the separator 24b in FIG. 8, a foil-shaped positive electrode plate 23a is inserted between the separator 24a and the outer peripheral face of the winding core 21 while fitted in the mounted base end position of the separator 24a. The foil-shaped positive electrode plate 23a, the separator 24a, the foil-shaped negative electrode plate 23b, and the separator 24b layered in this order from the inner periphery side are wound about the winding core 21 by driving of the winding roller 25 for rotation.

Positions and the like of not-applied portions 3a of the foil-shaped positive electrode plate 23a and the foil-shaped negative electrode plate 23b are the same as those in the above-described embodiment.

Processing after that is the same as that in the above-described embodiment. After the foil-shaped positive electrode plate 23a and the like are wound about the winding core 21, they are detached from the winding roller 25, and pressed and flattened in a direction of the normal to the outer peripheral face to form the flat power generating element 3.

Figure 7:
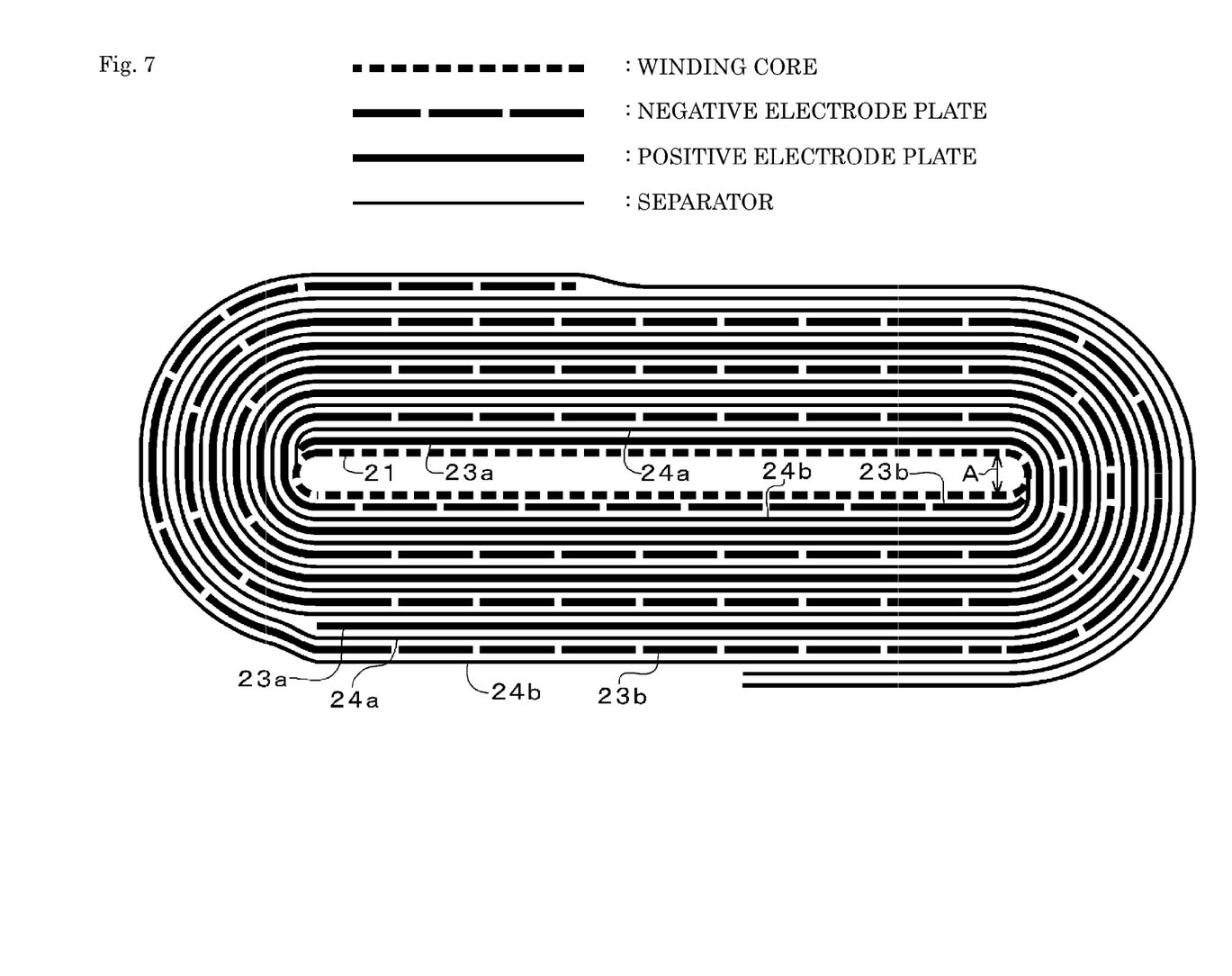
FIG. 7 is a schematic diagram showing a structure of a power generating element according to the other embodiment of the present invention.

FIG. 7 schematically shows, in a direction of a central axis of the winding core 21, a manner in which the foil-shaped positive electrode plate 23a and the like are wound about the winding core 21 in the flattened shape.

As shown in FIG. 7, because the foil-shaped positive electrode plate 23a and the like and the winding core 21 are flattened so that the mounted base end positions of the separators 24a and 24b functioning as the pair of positioning members are allocated to longitudinal opposite end portions of the flat shape, when seen in the direction of the winding axis of the foil-shaped positive electrode plate 23a and the like, the foil-shaped positive electrode plate 23a and the foil-shaped negative electrode plate 23b face each other with the winding core 21 interposed therebetween at an innermost layer of the winding, and active material layers formed on their opposed faces effectively function as the battery.

Similarly to the above-described embodiment, material and thickness of the winding core 21 and pressurizing conditions in flattening the foil-shaped positive electrode plate 23a and the like wound about the winding core 21 are set so that a width (width on a short width side), designated by a reference sign A in FIG. 7, of the flat winding core 21 when seen in the direction of the winding axis is 1 mm or greater at least at the longitudinal end portions.

(2) Although the sheet-shaped member is wound into the circular cylindrical shape to form the winding core 21, and the winding core 21 has the hollow shape in the above-described embodiment, the winding core may be formed into a flat and solid rectangular parallelepiped with rounded edge portions which come in contact with the foil-shaped negative electrode plate 23b and the like, for example.

If the winding core is formed in this manner, the winding core is made of electrical insulating material and is porous so as to let electrolyte solution and the like therethrough, and the foil-shaped negative electrode plate 23b starts to be wound from one of the longitudinal end portions of the winding core while the foil-shaped negative electrode plate 23b starts to be wound from the other longitudinal end portion, when seen in the direction of the winding axis as in the above-described embodiment.

(3) Although the positive active material layers are formed in areas of the foil-shaped positive electrode plate and facing the front face and the back face of the end portion (i.e., the tip end) of the foil-shaped negative electrode plate on a winding starting side in the above-described embodiment, the areas may not have the positive active material layers. By employing such a structure, it is possible to prevent formation of lithium metal dendrite at the tip end of the foil-shaped negative electrode plate. This effect is exerted in a state in which the positive active material layers in the areas do not contribute to the charge and discharge reaction. Therefore, surfaces of the positive active material layers may be covered with layers made of material having low or zero permeability to a substance such as a lithium ion instead of obtaining the state in which the positive active material layers do not exist.

The state in which the positive active material layers do not exist can be achieved by peeling the positive active material layers or by applying the active material by a method of not applying the active material on the portions, i.e., what is called intermittent application. The latter method is preferable to the former, because the peeling process can be omitted.

If the structure in which the active material does not exist in the areas of the foil-shaped positive electrode plate and facing the front face and the back face of the tip end of the foil-shaped negative electrode plate is employed, it is preferable that the end portion of the negative electrode on the winding starting side is positioned at one of the longitudinal opposite end portions of the flat shape, when seen in the direction of the winding axis. This is because, in this way, the area (area A) of the foil-shaped positive electrode plate and facing the front face of the tip end of the foil-shaped negative electrode plate and the area (area B) facing the back face are continuous with each other. As a result, processing for forming the areas without the active material on the foil-shaped positive electrode plate becomes easy. As shown in FIG. 4, if the end portion of the negative electrode on the winding starting side is positioned at one of the longitudinal opposite end portions of the flat shape when seen in the direction of the winding axis, the area A and the area B become continuous with each other. On the other hand, if the end portion of the negative electrode on the winding starting side is positioned at any other portion, the area A and the area B are disposed away from each other. It is generally difficult to peel the active material or to provide not-applied portions in the areas away from each other, because high positional accuracy is required.

DESCRIPTION OF REFERENCE SIGNS 3 power generating element
21 winding core 22a, 22b positioning member
23a foil-shaped positive electrode plate
23b foil-shaped negative electrode plate
24a, 24b separator

The invention claimed is:

1. A battery comprising: a power generating element formed by winding a positive electrode plate and a negative electrode plate, on which active material layers are formed respectively, about a winding core, with a separator sandwiched therebetween, and forming the electrode plates into a flat shape,
wherein the winding core is formed by a porous member, and
the positive electrode plate and the negative electrode plate are disposed so that innermost tip end portions of active material layers on the positive and negative plates are symmetric with respect to a central axis of the winding core interposed therebetween.

2. The battery according to claim 1, wherein the power generating element is formed into the flat shape by winding the positive electrode plate and the negative electrode plate, with the separator sandwiched therebetween, about the winding core formed by forming a flexible sheet-shaped member into a circular cylindrical shape and pressing the plates in a direction of a normal to an outer peripheral face.

3. The battery according to claim 1, wherein a positioning member for coming in contact with and positioning a tip end portion of the positive electrode plate or the negative electrode plate is attached to an outer face of the winding core on which the positive electrode plate, the negative electrode plate, or the separator is to be wound.

4. The battery according to claim 3, wherein the positioning member is formed by a sheet extending out along a winding direction of the positive electrode plate, the negative electrode plate, or the separator, with one end of the sheet fixed to the outer face of the winding core.

5. The battery according to claim 4, wherein the positioning member is formed by fixing a tip end portion of the separator on a winding starting side to the winding core.

6. The battery according to claim 3, comprising a pair of positioning members, each equivalent to the positioning member, respectively for positioning the positive electrode plate and the negative electrode plate and allocated to longitudinal opposite end portions of the winding core when seen in a direction of a winding axis.

7. The battery according to claim 1, wherein the battery comprises two separators disposed between the positive electrode plate and the negative electrode plate, and the two separators are disposed in the battery so that the winding core is interposed between innermost tip end portions of the two separators.

8. The battery according to claim 1, wherein the battery comprises two separators disposed between the positive electrode plate and the negative electrode plate, and the two separators are disposed in the battery so that innermost tip end portions of the two separators are symmetric with respect to the central axis of the winding core.

9. A battery comprising:
a winding core comprising a porous member;
a first sheet, one end of the first sheet being attached to an outer surface of the winding core;
a positive electrode plate and a positive active material layer over the positive electrode plate;
a negative electrode plate and a negative active material layer over the negative electrode plate; and
a first separator and a second separator between the positive electrode plate and the negative electrode plate,
wherein the positive electrode plate, the negative electrode plate, and the first and second separators are wound about the winding core; and
an innermost tip end portion of the positive electrode plate or negative electrode plate is located between the winding core and the first sheet.

10. The battery according to claim 9, wherein the battery further comprises a second sheet, one end of the second sheet being attached to the outer surface of the winding core;
an innermost tip end portion of the positive electrode plate is located between the winding core and the first sheet; and
an innermost tip end portion of the negative electrode plate is located between the winding core and the second sheet.

11. The battery according to claim 9, wherein the battery further comprises a second sheet, one end of the second sheet being attached to the outer surface of the winding core;
innermost tip end portions of the positive electrode plate and the first separator are located between the winding core and the first sheet; and
innermost tip end portions of the negative electrode plate and the second separator are located between the winding core and the second sheet.

12. The battery according to claim 11, wherein the winding core is interposed between portions of outer surface of the winding core to which the first sheet and the second sheet are attached.

13. The battery according to claim 11, wherein portions of outer surface of the winding core to which the first sheet and the second sheet are attached are symmetric with respect to a central axis of the winding core.

14. The battery according to claim 9, wherein the innermost tip end portion of the positive electrode plate or negative electrode plate is in contact with the outer surface of the winding core.

15. The battery according to claim 9, wherein the battery further comprises a second sheet, one end of the second sheet being attached to the outer surface of the winding core;
an innermost tip end portion of the positive electrode plate is in contact with the outer surface of the winding core and located between the winding core and the first sheet; and
an innermost tip end portion of the negative electrode plate is in contact with the outer surface of the winding core and located between the winding core and the second sheet.

16. The battery according to claim 9, wherein the battery further comprises a second sheet, one end of the second sheet being attached to the outer surface of the winding core;
innermost tip end portions of the positive electrode plate and the first separator are located between the winding core and the first sheet, the innermost tip end portion of the positive electrode plate is in contact with the outer surface of the winding core, the innermost tip end portion of the first separator is in contact with the first sheet; and
innermost tip end portions of the negative electrode plate and the second separator are located between the winding core and the second sheet, the innermost tip end portion of the negative electrode plate is in contact with the outer surface of the winding core, the innermost tip end portion of the second separator is in contact with the second sheet.

17. The battery according to claim 9, wherein the first sheet extends out in a winding direction of the positive electrode plate or the negative electrode plate from the outer surface of the winding core.

18. The battery according to claim 10, wherein the second sheet extends out in a winding direction of the positive electrode plate or the negative electrode plate from the outer surface of the winding core.

* * * * *